US009614779B2

(12) United States Patent
Sesha et al.

(10) Patent No.: US 9,614,779 B2
(45) Date of Patent: Apr. 4, 2017

(54) CLOUD COMPUTE SCHEDULING USING A HEURISTIC CONTENTION MODEL

(71) Applicant: Intel Corporation, Santa Clara, CA (US)

(72) Inventors: Subramony Sesha, Bangalore (IN); Archana Patni, Bangalore (IN); Ananth S. Narayan, Bangalore (IN); Mrittika Mrittika Ganguli, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 14/368,349

(22) PCT Filed: Dec. 24, 2013

(86) PCT No.: PCT/US2013/077659
§ 371 (c)(1),
(2) Date: Jun. 24, 2014

(87) PCT Pub. No.: WO2015/099701
PCT Pub. Date: Jul. 2, 2015

(65) Prior Publication Data
US 2015/0236971 A1    Aug. 20, 2015

(51) Int. Cl.
*G06F 15/173* (2006.01)
*H04L 12/911* (2013.01)
*H04L 29/08* (2006.01)

(52) U.S. Cl.
CPC .......... *H04L 47/70* (2013.01); *H04L 67/1095* (2013.01)

(58) Field of Classification Search
USPC ........................... 709/224, 225, 226
See application file for complete search history.

(56) References Cited

U.S. PATENT DOCUMENTS 7,318,128 B1 *  1/2008  Dice ..................... G06F 9/5033
                                                711/151
7,434,002 B1 * 10/2008  Zedlewski .......... G06F 11/3409
                                                711/130

(Continued)

OTHER PUBLICATIONS

International Search Report and Written Opinion for Application No. PCT/US2013/077659, dated Sep. 24, 2014, 12 pages.

*Primary Examiner* — Liangche A Wang
(74) *Attorney, Agent, or Firm* — Barnes & Thornburg LLP (57) ABSTRACT

Technologies for contention-aware cloud compute scheduling include a number of compute nodes in a cloud computing cluster and a cloud controller. Each compute node collects performance data indicative of cache contention on the compute node, for example, cache misses per thousand instructions. Each compute node determines a contention score as a function of the performance data and stores the contention score in a cloud state database. In response to a request for a new virtual machine, the cloud controller receives contention scores for the compute nodes and selects a compute node based on the contention score. The cloud controller schedules the new virtual machine on the selected compute node. The contention score may include a contention metric and a contention score level indicative of the contention metric. The contention score level may be determined by comparing the contention metric to a number of thresholds. Other embodiments are described and claimed.

8 Claims, 5 Drawing Sheets

(56) References Cited

U.S. PATENT DOCUMENTS

| | | | |
|---|---|---|---|
| 7,581,064 B1* | 8/2009 | Zedlewski | G06F 12/084 |
| | | | 711/118 |
| 2011/0055479 A1* | 3/2011 | West | G06F 9/4881 |
| | | | 711/118 |
| 2011/0246995 A1* | 10/2011 | Fedorova | G06F 9/5033 |
| | | | 718/103 |
| 2012/0226866 A1* | 9/2012 | Bozek | G06F 9/45558 |
| | | | 711/122 |
| 2013/0111035 A1* | 5/2013 | Alapati | G06F 9/5072 |
| | | | 709/226 |
| 2013/0167146 A1 | 6/2013 | Dong et al. | |
| 2013/0179713 A1 | 7/2013 | Balasubramanian et al. | |

* cited by examiner

CLOUD COMPUTE SCHEDULING USING A HEURISTIC CONTENTION MODEL

BACKGROUND

CROSS REFERENCE TO RELATED APPLICATIONS

This application is a national stage entry under 35 USC §371(b) of International Application No. PCT/US2013/077659, which was filed Dec. 24, 2013.

Cloud computing refers to highly scalable networked computing systems capable of delivering elastic computing performance to numerous users. Cloud computing typically involves clusters of densely packed computing servers, called nodes, with each node potentially executing dozens of virtual machines. Typically, each node includes a hypervisor or other virtualization framework, and the entire cloud computing cluster includes one or more cloud controllers that manage instantiation of virtual machines on the particular compute nodes. OpenStack is one example of such a cloud computing framework.

In a multi-tenant cloud computing environment, the virtual machines on a particular node may be controlled by different customers. Thus, the resources of the node, such as processor, network, and storage resources, must be shared among the virtual machines and thus among different customers. Cloud computing customers typically expect and may be sold a predictable performance level for each virtual machine in the cloud computing cluster. However, the performance of a virtual machine may be impacted by the behavior of other virtual machines on the same node. This is sometimes called the "noisy neighbor" problem; that is, some virtual machine workloads have side effects that impact the performance of other virtual machines executing on the same node. In addition to the outright reduction in performance, the noisy neighbor problem may cause virtual machine performance to be unpredictable, which can be particularly undesirable for cloud customers and providers.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
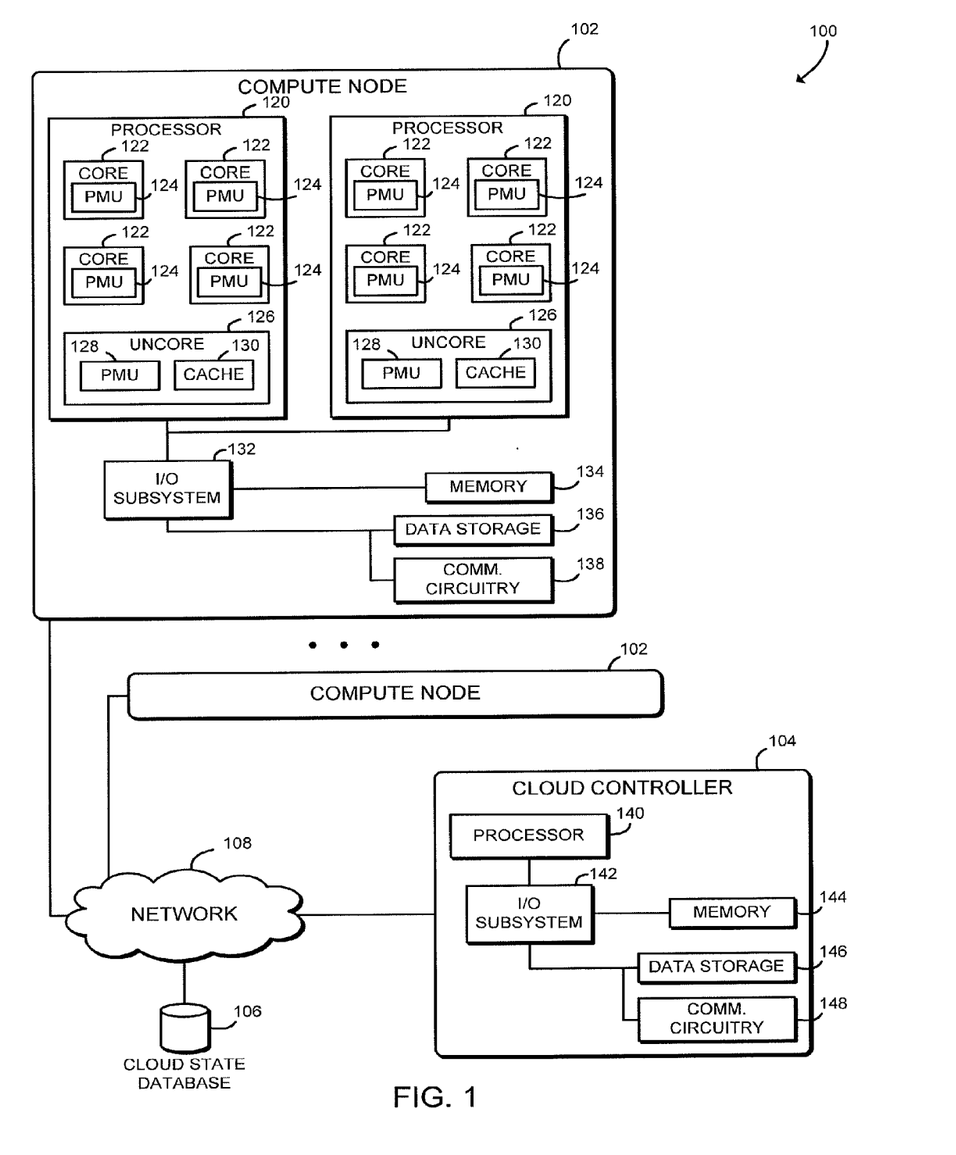
FIG. 1 is a simplified block diagram of at least one embodiment of a system for cloud compute scheduling.

Referring now to FIG. 1, in an illustrative embodiment, a system 100 for contention-aware cloud compute scheduling includes a number of compute nodes 102, a cloud controller 104, and a cloud state database 106, all in communication over a network 108. In use, as discussed in more detail below, each compute node 102 instantiates one or more virtual machines to perform computational tasks. Each compute node 102 monitors its performance, including cache contention, and generates a contention score. The contention scores for each compute node 102 are stored in the cloud state database 106. The cloud controller 104 schedules new virtual machines based on the reported contention scores of each of the compute nodes 102. Contention-aware cloud scheduling may allow for improved throughput by scheduling compatible workloads onto the same physical node. Additionally, contention-aware cloud scheduling may improve the predictability and/or stability of performance for cloud workloads. Although the illustrative embodiments involve monitoring socket-level cache contention, it should be understood that the technologies of this disclosure may apply to other contention domains of the compute nodes 102, such as socket contention, core contention, disk contention, or network contention.

Figure 2:
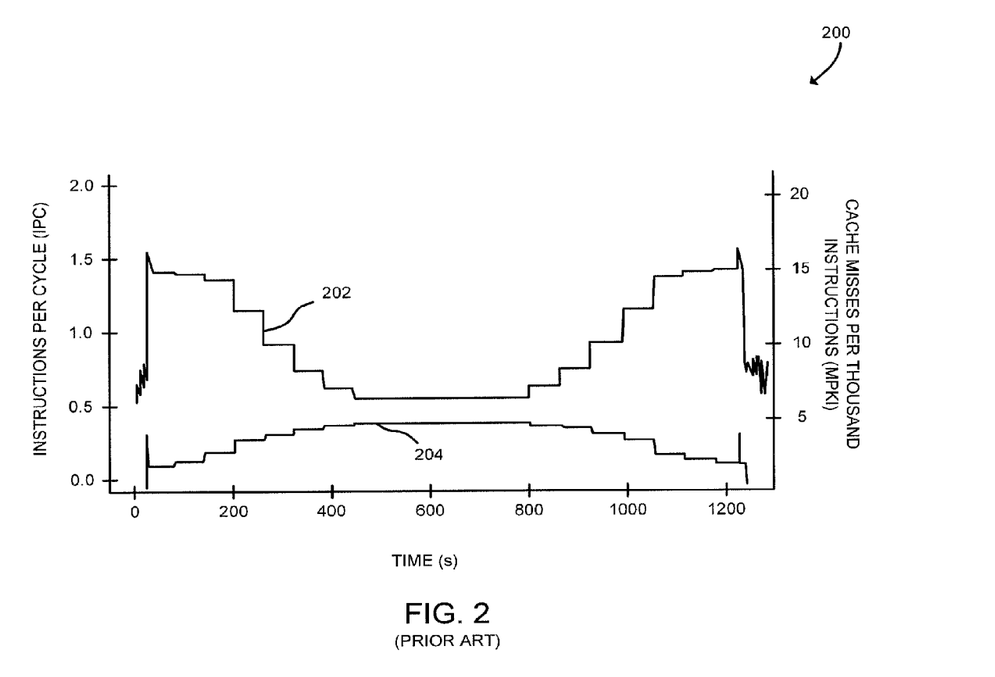
FIG. 2 is a combined plot measuring throughput and cache contention over time for various workloads on a cloud compute node.

Referring now to FIG. 2, typical cloud compute systems may suffer from the so-called "noisy neighbor" problem. In particular, performance of a virtual machine may be reduced by contention for non-partitionable resources of the compute node from other virtual machines executing on the same compute node. Chart 200 illustrates performance degradation that may occur due to multiple virtual machines executing on the same compute node. Curve 202 illustrates instructions per cycle for a virtual machine executing on a compute node, which is a measure of throughput. Curve 204 illustrates cache misses per thousand instructions (MPKI) for the compute node, which is a measure of cache contention. In the illustration, eight virtual machines each running an identical computational benchmark are instantiated sequentially, with each virtual machine pinned to a particular processor core. It would be expected that the throughput of each virtual machine would remain unchanged (at least until the number of virtual machines exceeds the number of physical cores in the compute node). However, in the illustrative example, as each virtual machine is instantiated, throughput drops. As shown by illustrative curve 202, throughput steps down as each virtual machine is instantiated. Curve 204 illustrates that cache contention also steps up as each virtual machine is instantiated. After all eight virtual machines are instantiated, the compute node reaches steady state and the curves 202, 204 level off. Note that throughput for each virtual machine has been significantly reduced compared to execution of a single virtual machine by itself. Next, the eight virtual machines are stopped sequentially, and as each virtual machine is stopped, throughput steps up as shown in curve 202 and contention steps down as shown in curve 204. Therefore, in a traditional cloud compute system, throughput achieved by a virtual machine may be affected by workloads executing in a different virtual machine on a different physical core of the same compute node.

Referring back to FIG. 1, each compute node 102 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. As shown in FIG. 1, each compute node 102 illustratively includes two processors 120, an input/output subsystem 132, a memory 134, a data storage device 136, and communication circuitry 138. Of course, the compute node 102 may include other or additional components, such as those commonly found in a server device (e.g., various input/output devices), in other embodiments. Additionally, in some embodiments, one or more of the illustrative components may be incorporated in, or otherwise form a portion of, another component. For example, the memory 134, or portions thereof, may be incorporated in one or more processor 120 in some embodiments.

Each processor 120 may be embodied as any type of processor capable of performing the functions described herein. Each illustrative processor 120 is a multi-core processor, however in other embodiments each processor 120 may be embodied as a single or multi-core processor(s), digital signal processor, microcontroller, or other processor or processing/controlling circuit. Each processor 120 illustratively includes four processor cores 122 and an uncore 126. Each of the processor cores 122 is an independent processing unit capable of executing programmed instructions. Each processor core 122 includes a performance monitoring unit ("PMU") 124. Each PMU 124 may be embodied as a number of performance counters capable of recording and monitoring the flow of instructions through the respective processor core 122. For example, each PMU 124 may be capable of counting clock cycles, instructions issued, instructions retired, cache misses, or similar events. The PMUs 124 may be programmed to monitor particular performance statistics using model-specific registers of the processor core 122. In one embodiment, each PMU 124 may include four fully programmable hardware counters and three fixed-function hardware counters. Software may access the PMUs 124 using a kernel interface such as the "perf" subsystem of the Linux kernel. Although each of the illustrative compute nodes 102 includes two processors 120 having four processor cores 122; each compute node 102 may include one, two, or more processors 120 having one, two, or more processor cores 122 each in other embodiments. In particular, this disclosure is also applicable to uniprocessor or single-core compute nodes 102.

Each processor 120 also includes an uncore 126. In the illustrative embodiment, each uncore 126 includes any part of the particular processor 120 not included in the processor cores 122 (e.g., all components of the particular processor 120 except for the processor cores 122 themselves). For example, the uncore 126 of each illustrative processor 120 includes a PMU 128 and cache memory 130. Similar to the PMUs 124 of the processor cores 122, the PMU 128 monitors performance statistics of the uncore 126, and may include a number of programmable or fixed-function hardware performance counters. The cache memory 130 may be a last-level cache shared by the processor cores 122. In some embodiments, the PMU 128 may monitor accesses to the cache memory 130, including recording cache misses, amounts of data transferred, and other cache information. Although not illustrated, the uncore 126 may additionally include typical components of a processor or a system-on-a-chip. For example, each uncore 126 may include a memory controller, processor graphics, input/output controllers, power management circuitry, or other components of the processor 120.

The memory 134 may be embodied as any type of volatile or non-volatile memory or data storage capable of performing the functions described herein. In operation, the memory 134 may store various data and software used during operation of the compute node 102 such as operating systems, applications, programs, libraries, and drivers. The memory 134 is communicatively coupled to the processor 120 via the I/O subsystem 132, which may be embodied as circuitry and/or components to facilitate input/output operations with the processor 120, the memory 134, and other components of the compute node 102. For example, the I/O subsystem 132 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 132 may form a portion of a system-on-a-chip (SoC) and be incorporated, along with the processor 120, the memory 134, and other components of the compute node 102, on a single integrated circuit chip.

The data storage device 136 may be embodied as any type of device or devices configured for short-term or long-term storage of data such as, for example, memory devices and circuits, memory cards, hard disk drives, solid-state drives, or other data storage devices. The data storage device 136 may store performance statistics monitored by the compute node 102.

The communication circuitry 138 of the compute node 102 may be embodied as any communication circuit, device, or collection thereof, capable of enabling communications between the compute node 102, the cloud controller 104, the cloud state database 106, and/or other remote devices over the network 108. The communication circuitry 138 may be configured to use any one or more communication technology (e.g., wired or wireless communications) and associated protocols (e.g., Ethernet, Bluetooth®, Wi-Fi®, WiMAX, etc.) to effect such communication.

The cloud controller 104 is configured to manage virtual machines or other compute instances distributed among the compute nodes 102 of the system 100. The cloud controller 104 may be embodied as any type of server computing device, or collection of devices, capable of performing the functions described herein. As such, the cloud controller 104 may be embodied as a single server computing device or a collection of servers and associated devices. For example, in some embodiments, the cloud controller 104 may be embodied as a "virtual server" formed from multiple computing devices distributed across the network 108 and operating in a public or private cloud. Accordingly, although the cloud controller 104 is illustrated in FIG. 1 as embodied as a single server computing device, it should be appreciated that the cloud controller 104 may be embodied as multiple devices cooperating together to facilitate the functionality described below. Illustratively, the cloud controller 104 includes a processor 140, an I/O subsystem 142, a memory 144, a data storage device 146, communication circuitry 148, and/or other components and devices commonly found in a server or similar computing device. Those individual components of the cloud controller 104 may be similar to the corresponding components of the compute nodes 102, the description of which is applicable to the corresponding components of the cloud controller 104 and is not repeated herein so as not to obscure the present disclosure.

The cloud state database 106 stores information that is synchronized across the system 100, including performance statistics. The cloud state database 106 may be embodied as a dedicated database server, distributed data storage, or any other data storage system capable of maintaining consistent state for the system 100. As such, copies or portions of the cloud state database 106 may be stored in the data storage 136 of each compute node 102 and/or the data storage 146 of the cloud controller 104. Updated cloud state information may be transferred between the compute nodes 102, the cloud controller 104, and/or the cloud state database 106 using any communication protocol. In some embodiments, cloud state information may be transferred asynchronously using a message bus, for example a message bus implementing the advanced message queuing protocol (AMQP), such as rabbitmq.

As discussed in more detail below, the compute nodes 102, the cloud controller 104, and the cloud state database 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of the system 100.

Figure 3:
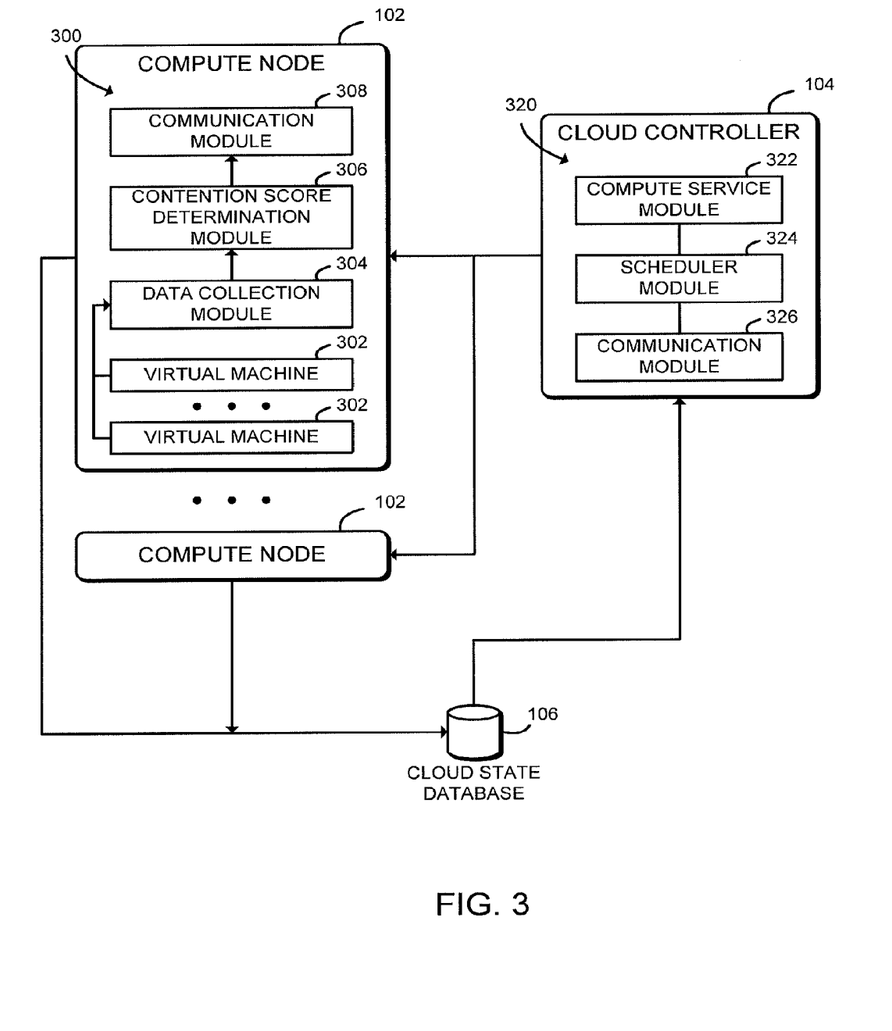
FIG. 3 is a simplified block diagram of at least one embodiment of various environments that may be established by the system of FIG. 1.

Referring now to FIG. 3, in an illustrative embodiment, each compute node 102 establishes an environment 300 during operation. The illustrative environment 300 includes a number of virtual machines 302, a data collection module 304, a contention score determination module 306, and a communication module 308. The various modules of the environment 300 may be embodied as hardware, firmware, software, or a combination thereof.

Each virtual machine 302 is configured to perform a cloud computing workload on the compute node 102. Each virtual machine 302 may be pinned, assigned, or otherwise allocated to one or more of the processor cores 122. In some embodiments, each virtual machine 302 may specify a number of desired virtual CPUs, and the virtual machine 302 may be assigned to that number of processor cores 122. In a multi-tenant cloud computing environment, each virtual machine 302 may be controlled by a different entity and therefore additionally may execute a workload having different performance characteristics. In particular, each virtual machine 302 may exert different pressure on the cache memory 130 of the compute node 102. As described below, the virtual machines 302 are instantiated and otherwise managed by the cloud controller 104.

The data collection module 304 is configured to collect performance data for the compute node 102. The data collection module 304 may collect data indicative of cache contention on the compute node 102, for example data measuring cache misses in the cache memory 130. The data collection module 304 may include individual data collectors for each processor 120 and/or processor core 122 of the compute node 102, or for each virtual machine 302. The data collection module 304 may filter the collected data to remove noise. The data collectors of the data collection module 304 may communicate with each other asynchronously, for example using a message bus such as the zeromq message bus.

The contention score determination module 306 is configured to calculate a contention score as a function of the performance data collected by the data collection module 304. The contention score may include both a contention metric and a contention score level. The contention metric may include aggregated data describing cache misses for all processors 120 of the compute node 102. The contention score level may be generated by a heuristic algorithm, and may be selected from levels for low contention, medium contention, and high contention (e.g., via a form of quantization). Calculation of the contention metric and the contention score level is further described below.

The communication module 308 is configured to transmit the calculated contention score to the cloud state database 106. As described below, the contention score is then accessible to the cloud controller 104 through the cloud state database 106. The communication module 308 may transmit the contention score as a tuple including the contention metric and the contention score level. The communication module 308 may use any communication method to interface with the other members of the system 100. For example, the communication module 308 may be embodied as a message bus.

Still referring to FIG. 3, each compute node 102 communicates with the cloud controller 104, which each may establish an environment 320 during operation. The illustrative environment 320 includes a compute service module 322, a scheduler module 324, and a communication module 326. The various modules of the environment 320 may be embodied as hardware, firmware, software, or a combination thereof.

The compute service module 322 is configured to receive requests to instantiate a new virtual machine 302, and to schedule the new virtual machine 302 for execution on a compute node 102 selected by the scheduler module 324. The compute service module 322 may receive commands from any appropriate source. For example, the compute service module 322 may receive commands from a cloud system administrator or from a cloud computing customer through a web-based control interface. As another example, in some embodiments, the compute service module 322 may receive a command for a new virtual machine 302 based on demand for computing services, for example to scale to respond to application demand.

The scheduler module 324 is configured to select the appropriate compute node 102 based on the contention score data. In some embodiments, the scheduler module 324 may be embodied as a filter scheduler that selects a compute node 102 having the lowest reported contention score level. When two or more compute nodes 102 have the lowest reported contention score level, the scheduler module 324 may select one randomly or by using any other available selection criteria. For example, in some embodiments, the scheduler module 324 may further sort the compute nodes 102 and select the compute node 102 having the lowest contention metric.

The communication module 326 is configured to receive contention score data from the cloud state database 106 for all compute nodes 102 within the system 100. The communication module 326 may receive a tuple from the cloud state database 106 for each compute node 102 containing the contention metric and the contention score level. The communication module 326 may use any communication method to interface with the other members of the system 100. For example, the communication module 326 may be embodied as a message bus.

Figure 4:
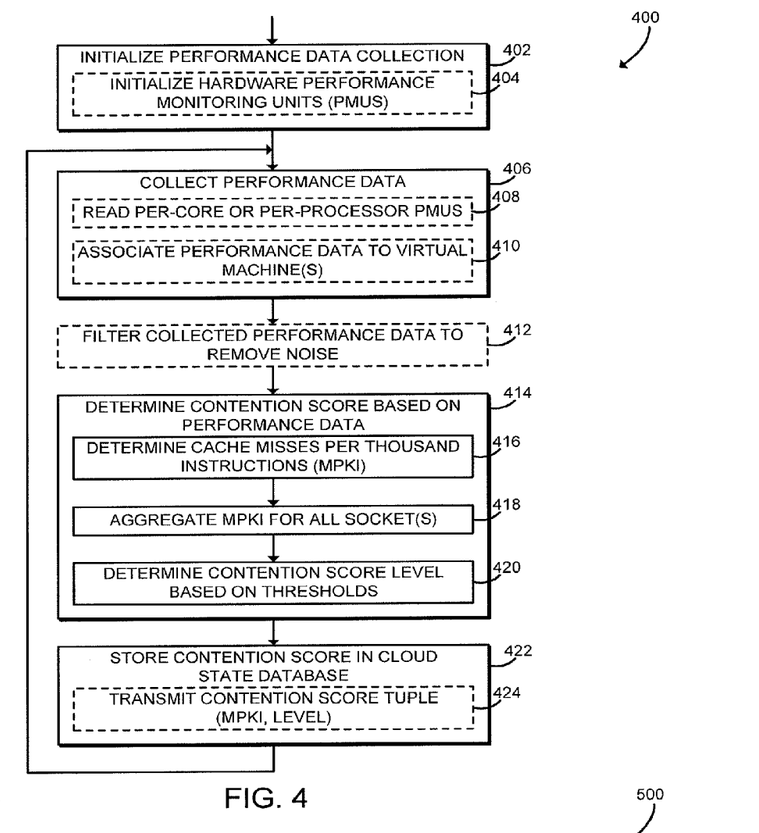
FIG. 4 is a simplified flow diagram of at least one embodiment of a method for performance data collection that may be executed by a compute node of the system of FIGS. 1 and 3.

Referring now to FIG. 4, in use, each compute node 102 may execute a method 400 for collecting performance data. The method 400 begins with block 402, in which the compute node 102 initializes performance data collection. The compute node 102 may prepare data structures, counters, timers, or other mechanisms to enable monitoring instruction flow and cache contention within the processors 120. In some embodiments, in block 404 the compute node 102 may initialize the PMUs 124, 128 to begin monitoring performance data. For example, in some embodiments, performance data collection may be initialized for each virtual machine 302. That is, the PMUs 124, 128 and/or any other performance data collection systems may be initialized for every virtual machine 302 instantiated on the compute node 102. To initialize the performance counters, the compute node 102 may use a software interface such as the Linux performance monitoring subsystem "perf."

In block 406, the compute node 102 collects performance data. The compute node 102 may collect information on instruction flow within the processors 120 and the processor cores 122, including the number of instructions issued and/or retired and the number of clock cycles. The compute node 102 may also collect information on cache contention, including the number of cache misses in the cache memory 130. In some embodiments, in block 408 the compute node 102 may monitor performance by reading the per-core PMUs 124 and/or the per-processor PMUs 128. Additionally, in some embodiments, in block 410 the compute node 102 may associate collected performance data with the appropriate virtual machine 302 executing on the compute node 102. As described above, a typical PMU 124, 128 may include a limited number of hardware counters, such as four programmable counters and three fixed-function counters. Thus, the compute node 102 may multiplex the available hardware counters among several processes, for example by sampling performance data for each process in discrete timeslices and storing the hardware counts in memory 134 and/or data storage 136 when not monitoring. Associating performance data with the virtual machines 302 may, for example, allow the compute node 102 to disregard performance data for processor cores 122 that are not executing virtual machines 302. The compute node 102 may associate performance data with the appropriate virtual machine 302 by tracking the lifecycle of the virtual machines 302 (i.e., when each virtual machine 302 is started, stopped, suspended, etc.). In some embodiments, the compute node 102 may track virtual machine lifecycle using a virtualization library such as libvirt.

In some embodiments, in block 412 the compute node 102 may filter the collected performance data to remove noise. For example, as described above the compute node 102 may collect performance data by sampling the PMUs 124, 128 over relatively small timeslices. Thus, sampling error may be introduced into the performance data. The sampling error typically occurs for one or two sample periods. The compute node 102 may apply a quartile based outlier detection algorithm, or other filtering algorithm, to remove the erroneous samples and thereby clean the collected performance data. Additionally, to prevent data corruption from random tasks other than virtual machines 302 executing on processor cores 122, the compute node 102 may set performance data (such as memory cache misses) to zero for all processor cores 122 that have not been allocated a virtual machine 302.

In block 414, the compute node 102 determines the contention score for the compute node 102, based on the collected performance data. The contention score measures the cache memory 130 contention experienced on the compute node 102. The contention score may be embodied as a tuple including the cache misses per some reference number of instructions (e.g., per thousand instructions), as well as a contention score level (e.g., high, medium, or low contention). In block 416, the compute node 102 determines cache misses per thousand instructions (MPKI). The compute node 102 may determine MPKI by dividing the number of misses to the last-level-cache 130, read from a PMU 124, by the number of instructions retired, also read from that PMU 124, and multiplying the result by one thousand. The compute node 102 may calculate MPKI on a per-core 122 or a per-processor 120 basis, depending on the performance data available from the PMUs 124, 128. In block 418, the compute node 102 aggregates MPKI for all physical sockets. That is, the compute node 102 combines the MPKI values for all processors 120 and/or processor cores 122 to determine an aggregate MPKI value for the compute node 102.

In some embodiments, aggregation of MPKI values may be performed by a performance monitoring subsystem, such as the perf subsystem. Although the illustrative embodiment calculates MPKI, in other embodiments the compute node 102 may calculate the cache misses per some other reference number of instructions (e.g., cache misses per instruction, cache misses per hundred instructions, and so on). In block 420, the compute node 102 determines a contention score level (e.g., high, medium, or low) for the aggregated MPKI value based on a set of threshold values. In other words, the compute node 102 quantizes the MPKI value to one of a number of preset contention score levels. The threshold values may be determined, for example, based on a heuristic contention model of the compute node 102, historical performance data, or any other criteria. One embodiment of a method for determining the contention score level is described below in connection with FIG. 5.

In block 422, the compute node 102 stores the contention score in the cloud state database 106. The compute node 102 may use any data connection or data protocol to update the contention score. In some embodiments, in block 424, the compute node 102 transmits a tuple containing the MPKI value and the contention score level to the cloud state database 106. The compute node 102 may transmit the tuple over a message bus, for example in some embodiments the rabbitmq message bus. After storing the contention score, the method 400 loops back to block 406 to continue collecting performance data for the compute node 102.

Figure 5:
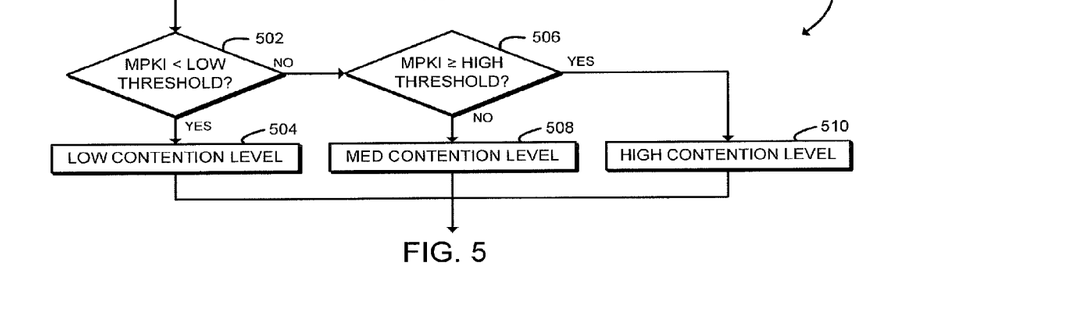
FIG. 5 is a simplified flow diagram of at least one embodiment of a method for determining a contention score level that may be executed by a compute node of the system of FIGS. 1 and 3.

Referring now to FIG. 5, in use, each compute node 102 may execute a method 500 for determining a contention score level. The method 500 may be used as method for determining the contention score level as described above with respect to block 420 of FIG. 4.

The method 500 begins in block 502, in which the compute node 102 determines whether the measured cache misses per thousand instructions (MPKI) value (or per other reference number of instructions) is less than a low threshold. The low threshold may be determined through, for example, empirical modeling of the behavior of virtual machines 302 on the compute node 102. In some embodiments, the low threshold may be 3 MPKI. If the MPKI value is greater than or equal to the low threshold, the method 500 branches to block 506, described below. If the MPKI value is less than the low threshold, the method 500 branches to block 504, in which the contention score level is set to a low contention level. After assigning the contention level, the method 500 is completed.

As described above, if the MPKI value is greater than or equal to the low threshold, the method 500 branches to block 506. In block 506, the compute node 102 determines whether the measured MPKI value is greater than or equal to a high threshold. Similar to the low threshold, the high threshold may be determined, for example, through empirical modeling of the behavior of virtual machines on the compute node 102. In some embodiments, the high threshold may be 50 MPKI. If the MPKI value is greater than or equal to the high threshold, the method 500 branches to block 510, described below. If the MPKI value is less than the high threshold, the method 500 branches to block 508, in which the contention score level is set to a medium contention level. After assigning the contention level, the method 500 is completed.

Referring back to block 506, if the MPKI value is greater than or equal to the high threshold, the method 500 branches to block 510. In block 510, the contention score level is set to a high contention level. After assigning the contention level, the method 500 is completed. Although the method 500 illustrates selecting between three content score levels (i.e. high, medium, and low contention) it should be understood that in other embodiments, different granularities may be used to quantize or otherwise set the content score levels. For example, some embodiments may select between two content score levels (e.g. low and high contention), some embodiments may select between five content score levels, and so on.

Figure 6:
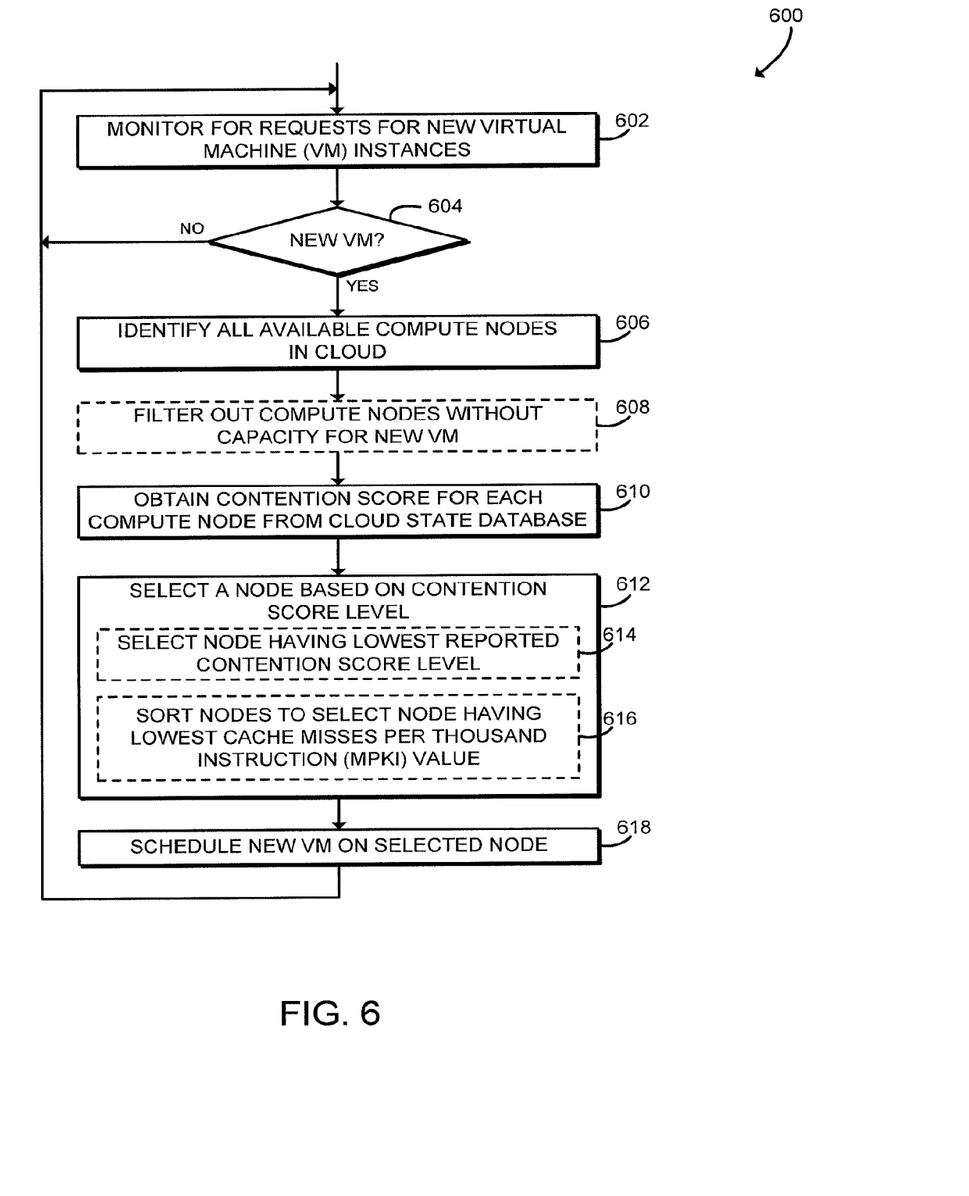
FIG. 6 is a simplified flow diagram of at least one embodiment of a method for contention-aware compute scheduling that may be executed by a cloud controller of the system of FIGS. 1 and 3.

Referring now to FIG. 6, in use, the cloud controller 104 may execute a method 600 for contention-aware compute scheduling. The method 600 begins in block 602, in which the cloud controller 104 monitors for requests for new virtual machine 302 instances. The requests for virtual machine 302 instances may be received through a cloud compute application programming interface, and may be generated by a user request, or by an automated request. For example, new virtual machine 302 instances may be requested by a cloud customer or a cloud administrator to meet increased demand for an application service. In block 604, the cloud controller 104 determines whether a new virtual machine 302 has been requested. If not, the method 600 loops back to block 602 to continue monitoring for virtual machine 302 requests. If a new virtual machine 302 has been requested, the method 600 advances to block 606 to schedule the new virtual machine 302.

In block 606, the cloud controller 104 identifies all available compute nodes 102 in the cloud system 100. The cloud controller 104 may use any technique available to identify available nodes. For example, the cloud controller 104 may query the cloud state database 106 for information on available nodes.

In some embodiments, in block 608 the cloud controller 104 may filter out any compute nodes 102 that lack capacity for a new virtual machine 302. For example, the cloud controller 104 may filter out compute nodes 102 on which a threshold number of virtual machines 302 and/or virtual CPUs have already been instantiated. The threshold number of virtual machines 302 and/or virtual CPUs may be set to the number of processor cores 122 included in the compute node 102, or to the number of processor cores 122 plus a predefined overcommit factor. In some embodiments, the cloud controller 104 may filter out compute nodes 102 that have fewer available processor cores 122 than the number of virtual CPUs requested by the new virtual machine 302. Filtering may be performed by a filter scheduler of a cloud compute framework such as nova.

In block 610, the cloud controller 104 obtains a contention score for each remaining compute node 102 from the cloud state database 106. As described above, the contention score may be embodied as a tuple including a cache miss per thousand (or other reference number) instructions (MPKI) value and a contention score level. The cloud controller 104 may use any available technique to query the cloud state database 106. For example, the cloud controller 104 may communicate with the cloud state database 106 over a message bus such as the rabbitmq message bus.

In block 612, the cloud controller 104 selects a compute node 102 based on contention score level. In some embodiments, in block 614 the cloud controller 104 may select a compute node 102 having the lowest reported contention score level. For example, the cloud controller 104 may select any compute node 102 having the low contention level. When no compute nodes 102 are available with the low contention level, the cloud controller 104 may select any compute node 102 having the medium contention level, and so on. The cloud controller 104 may use any criteria to select from among compute nodes 102 having the lowest available contention score level, such as random selection, round robin selection, or other selection criteria. In some embodiments, in block 616, the cloud controller 104 may sort the compute nodes 102 to select the compute node 102 having the lowest MPKI value, that is, the lowest measured cache contention.

In block 618, the cloud controller 104 schedules a new virtual machine 302 on the selected compute node 102. The cloud controller 104 may use any protocol or technique to schedule the new virtual machine 302. For example, the cloud controller 104 may schedule the virtual machine using a cloud computing framework such as nova. In some embodiments, the cloud controller 104 may communicate with a hypervisor or other virtualization framework of the selected compute node 102 to instantiate the new virtual machine 302, for example through an application programming interface. After scheduling the new virtual machine 302, the method 600 loops back to block 602 to monitor for additional requests to schedule virtual machines 302.

EXAMPLES

Illustrative examples of the technologies disclosed herein are provided below. An embodiment of the technologies may include any one or more, and any combination of, the examples described below.

Example 1 includes a cloud controller of a cloud computing cluster, the cloud controller comprising a compute service module to receive a request for a new virtual machine; a communication module to receive a contention score for each compute node of a plurality of compute nodes of the cloud computing cluster, the contention score to indicate cache memory contention of the compute node; and a scheduler module to select a compute node based on the contention score; wherein the compute service module is further to schedule the new virtual machine on the selected compute node.

Example 2 includes the subject matter of Example 1, and wherein the contention score comprises a contention metric, the contention metric being a function of a number of cache misses of the compute node.

Example 3 includes the subject matter of any of Examples 1 and 2, and wherein the contention metric comprises a rate of cache misses per reference number of instructions of the compute node.

Example 4 includes the subject matter of any of Examples 1-3, and wherein the rate of cache misses per reference number of instructions comprises the rate aggregated for all processor cores of the compute node.

Example 5 includes the subject matter of any of Examples 1-4, and wherein to select the compute node comprises to sort the plurality of compute nodes based on the contention metric to select a compute node having the lowest contention metric.

Example 6 includes the subject matter of any of Examples 1-5, and wherein the contention score comprises a contention score level indicative of a contention metric of the compute node.

Example 7 includes the subject matter of any of Examples 1-6, and wherein the contention core level comprises a contention score level being a quantization of the contention metric.

Example 8 includes the subject matter of any of Examples 1-7, and wherein the contention score level comprises a contention score level being determined by a comparison of a rate of cache misses of the compute node per reference number of instructions of the compute node to one or more threshold values.

Example 9 includes the subject matter of any of Examples 1-8, and wherein the contention score level comprises: a low contention level indicative of the rate of cache misses per reference number of instructions being less than a low contention threshold value; a medium contention level indicative of the rate of cache misses per reference number of instructions being greater than or equal to the low contention threshold value and less than a high contention threshold value; or a high contention level indicative of the rate of cache misses per reference number of instructions being greater than or equal to the high contention threshold value.

Example 10 includes the subject matter of any of Examples 1-9, and wherein the low contention threshold value comprises 3 cache misses per thousand instructions, and wherein the high contention threshold value comprises 50 cache misses per thousand instructions.

Example 11 includes the subject matter of any of Examples 1-10, and wherein to select the compute node comprises to select a compute node having the lowest contention score level of the plurality of compute nodes.

Example 12 includes the subject matter of any of Examples 1-11, and wherein the scheduler module is further to filter the plurality of compute nodes to remove any compute nodes lacking capacity for the new virtual machine prior to receipt of the contention score.

Example 13 includes a compute node of a cloud computing cluster, the compute node comprising a data collection module to collect performance data indicative of cache memory contention of the compute node; a contention score determination module to determine a contention score as a function of the performance data, the contention score to include a contention metric and a contention score level indicative of the contention metric; and a communication module to store the contention score in a cloud state database, the cloud state database accessible by a cloud controller of the cloud computing cluster.

Example 14 includes the subject matter of Example 13, and further including a processor core including a performance monitoring unit, wherein to collect the performance data comprises to read the performance monitoring unit of the processor core.

Example 15 includes the subject matter of any of Examples 13 and 14, and further including a processor including an uncore, the uncore including a performance monitoring unit, wherein to collect the performance data comprises to read the performance monitoring unit of the uncore of the processor.

Example 16 includes the subject matter of any of Examples 13-15, and wherein to collect the performance data comprises to associate the performance data with one or more virtual machines executed by the compute node.

Example 17 includes the subject matter of any of Examples 13-16, and wherein the data collection module is further to filter the performance data to remove noise, prior to determination of the contention score.

Example 18 includes the subject matter of any of Examples 13-17, and wherein to determine the contention score comprises to determine the contention metric as a function of a number of cache misses of the compute node.

Example 19 includes the subject matter of any of Examples 13-18, and wherein to determine the contention metric comprises to determine a rate of cache misses per reference number of instructions.

Example 20 includes the subject matter of any of Examples 13-19, and wherein to determine the contention metric further comprises to aggregate the rate of cache misses per reference number of instructions for all processor cores of the compute node.

Example 21 includes the subject matter of any of Examples 13-20, and wherein to determine the contention score comprises to determine the contention score level by quantization of the contention metric.

Example 22 includes the subject matter of any of Examples 13-21, and wherein to determine the contention score comprises to determine the contention score level by comparison of the rate of cache misses per reference number of instructions to one or more threshold values.

Example 23 includes the subject matter of any of Examples 13-22, and wherein to determine the contention score level further comprises to compare the rate of cache misses per reference number of instructions to a low contention threshold value; set the contention score level to a low contention level in response to a determination that the rate is less than the low contention threshold value; compare the rate of cache misses per reference number of instructions to a high contention threshold value; set the contention score level to a medium contention level in response to a determination that the rate is greater than or equal to the low contention threshold value and less than the high contention threshold value; and set the contention score level to a high contention level in response to a determination that the rate is greater than or equal to the high contention threshold value.

Example 24 includes the subject matter of any of Examples 13-23, and wherein the low contention threshold value comprises 3 cache misses per thousand instructions, and wherein the high contention threshold value comprises 50 cache misses per thousand instructions.

Example 25 includes a method for cloud compute scheduling, the method comprising receiving, by a cloud controller of a cloud computing cluster, a request for a new virtual machine; receiving, by the cloud controller, a contention score for each compute node of a plurality of compute nodes of the cloud computing cluster, the contention score indicative of cache memory contention of the compute node; selecting, by the cloud controller, a compute node based on the contention score; and scheduling, by the cloud controller, the new virtual machine on the selected compute node.

Example 26 includes the subject matter of Example 25, and wherein receiving the contention score comprises receiving a contention metric, the contention metric being a function of a number of cache misses of the compute node.

Example 27 includes the subject matter of any of Examples 25 and 26, and wherein receiving the contention metric comprises receiving a rate of cache misses per reference number of instructions of the compute node.

Example 28 includes the subject matter of any of Examples 25-27, and wherein receiving the rate of cache misses per reference number of instructions of the compute node comprise receiving the rate aggregated for all processor cores of the compute node.

Example 29 includes the subject matter of any of Examples 25-28, and wherein selecting the compute node comprises sorting, by the cloud controller, the plurality of compute nodes based on the contention metric to select a compute node having the lowest contention metric.

Example 30 includes the subject matter of any of Examples 25-29, and wherein receiving the contention score comprises receiving a contention score level indicative of a contention metric of the compute node.

Example 31 includes the subject matter of any of Examples 25-30, and wherein receiving the contention core level comprises receiving a contention score level being a quantization of the contention metric.

Example 32 includes the subject matter of any of Examples 25-31, and wherein receiving the contention score level comprises receiving a contention score level, the contention score level being determined by comparing a rate of cache misses of the compute node per reference number of instructions of the compute node to one or more threshold values.

Example 33 includes the subject matter of any of Examples 25-32, and wherein receiving the contention score level comprises receiving a low contention level indicating the rate of cache misses per reference number of instructions is less than a low contention threshold value; receiving a medium contention level indicating the rate of cache misses per reference number of instructions is greater than or equal to the low contention threshold value and less than a high contention threshold value; or receiving a high contention level indicating the rate of cache misses per reference number of instructions is greater than or equal to the high contention threshold value.

Example 34 includes the subject matter of any of Examples 25-33, and wherein the low contention threshold value comprises 3 cache misses per thousand instructions, and wherein the high contention threshold value comprises 50 cache misses per thousand instructions.

Example 35 includes the subject matter of any of Examples 25-34, and wherein selecting the compute node comprises selecting a compute node having the lowest contention score level of the plurality of compute nodes.

Example 36 includes the subject matter of any of Examples 25-35, and further including filtering, by the cloud controller, the plurality of compute nodes to remove any compute nodes lacking capacity for the new virtual machine prior to receiving the contention score.

Example 37 includes a method for contention monitoring for cloud computing, the method comprising collecting, by a compute node of a cloud computing cluster, performance data indicative of cache memory contention of the compute node; determining, by the compute node, a contention score as a function of the performance data, the contention score including a contention metric and a contention score level indicative of the contention metric; and storing, by the compute node, the contention score in a cloud state database, the cloud state database accessible by a cloud controller of the cloud computing cluster.

Example 38 includes the subject matter of Example 37, and wherein collecting the performance data comprises reading a performance monitoring unit of a processor core of the compute node.

Example 39 includes the subject matter of any of Examples 37 and 38, and wherein collecting the performance data comprises reading a performance monitoring unit of an uncore of a processor of the compute node.

Example 40 includes the subject matter of any of Examples 37-39, and wherein the vehicle configuration management module to determine a vehicle identifier for the vehicle and retrieve the user vehicle configuration settings from the data storage wherein collecting the performance data comprises associating the performance data with one or more virtual machines executed by the compute node.

Example 41 includes the subject matter of any of Examples 37-40, and further including filtering, by the compute node, the performance data to remove noise, prior to determining the contention score.

Example 42 includes the subject matter of any of Examples 37-41, and wherein determining the contention score comprises determining the contention metric as a function of a number of cache misses of the compute node.

Example 43 includes the subject matter of any of Examples 37-42, and wherein determining the contention metric comprises determining a rate of cache misses per reference number of instructions.

Example 44 includes the subject matter of any of Examples 37-43, and wherein determining the contention metric further comprises aggregating the rate of cache misses per reference number of instructions for all processor cores of the compute node.

Example 45 includes the subject matter of any of Examples 37-44, and wherein determining the contention score comprises determining the contention score level by quantizing the contention metric.

Example 46 includes the subject matter of any of Examples 37-45, and wherein determining the contention score comprises determining the contention score level by comparing the rate of cache misses per reference number of instructions to one or more threshold values.

Example 47 includes the subject matter of any of Examples 37-46, and wherein determining the contention score level further comprises comparing the rate of cache misses per reference number of instructions to a low contention threshold value; setting the contention score level to a low contention level in response to determining that the rate is less than the low contention threshold value; comparing the rate of cache misses per reference number of instructions to a high contention threshold value; setting the contention score level to a medium contention level in response to determining that the rate is greater than or equal to the low contention threshold value and less than the high contention threshold value; and setting the contention score level to a high contention level in response to determining that the rate is greater than or equal to the high contention threshold value.

Example 48 includes the subject matter of any of Examples 37-47, and wherein the low contention threshold value comprises 3 cache misses per thousand instructions, and wherein the high contention threshold value comprises 50 cache misses per thousand instructions.

Example 49 includes a computing device comprising a processor; and a memory having stored therein a plurality of instructions that when executed by the processor cause the computing device to perform the method of any of Examples 25-48.

Example 50 includes one or more machine readable storage media comprising a plurality of instructions stored thereon that in response to being executed result in a computing device performing the method of any of Examples 25-48.

Example 51 includes a computing device comprising means for performing the method of any of Examples 25-48.

Example 52 includes a cloud controller of a cloud computing cluster, the cloud controller including means for receiving a request for a new virtual machine; means for receiving a contention score for each compute node of a plurality of compute nodes of the cloud computing cluster, the contention score indicative of cache memory contention of the compute node; means for selecting a compute node based on the contention score; and means for scheduling the new virtual machine on the selected compute node.

Example 53 includes the subject matter of Example 52, and wherein the means for receiving the contention score comprises means for receiving a contention metric, the contention metric being a function of a number of cache misses of the compute node.

Example 54 includes the subject matter of any of Examples 52 and 53, and wherein the means for receiving the contention metric comprises means for receiving a rate of cache misses per reference number of instructions of the compute node.

Example 55 includes the subject matter of any of Examples 52-54, and wherein the means for receiving the rate of cache misses per reference number of instructions of the compute node comprise means for receiving the rate aggregated for all processor cores of the compute node.

Example 56 includes the subject matter of any of Examples 52-55, and wherein the means for selecting the compute node comprises means for sorting the plurality of compute nodes based on the contention metric to select a compute node having the lowest contention metric.

Example 57 includes the subject matter of any of Examples 52-56, and wherein the means for receiving the contention score comprises means for receiving a contention score level indicative of a contention metric of the compute node.

Example 58 includes the subject matter of any of Examples 52-57, and wherein the means for receiving the contention core level comprises means for receiving a contention score level being a quantization of the contention metric.

Example 59 includes the subject matter of any of Examples 52-58, and wherein the means for receiving the contention score level comprises means for receiving a contention score level, the contention score level being determined by comparing a rate of cache misses of the compute node per reference number of instructions of the compute node to one or more threshold values.

Example 60 includes the subject matter of any of Examples 52-59, and wherein the means for receiving the contention score level comprises means for receiving a low contention level indicating the rate of cache misses per reference number of instructions is less than a low contention threshold value; means for receiving a medium contention level indicating the rate of cache misses per reference number of instructions is greater than or equal to the low contention threshold value and less than a high contention threshold value; or means for receiving a high contention level indicating the rate of cache misses per reference number of instructions is greater than or equal to the high contention threshold value.

Example 61 includes the subject matter of any of Examples 52-60, and wherein the low contention threshold value comprises 3 cache misses per thousand instructions, and wherein the high contention threshold value comprises 50 cache misses per thousand instructions.

Example 62 includes the subject matter of any of Examples 52-61, and wherein the means for selecting the compute node comprises means for selecting a compute node having the lowest contention score level of the plurality of compute nodes.

Example 63 includes the subject matter of any of Examples 52-62, and further means for comprising filtering the plurality of compute nodes to remove any compute nodes lacking capacity for the new virtual machine prior to receiving the contention score.

Example 64 includes a compute node of a cloud computing cluster, the compute node including means for collecting performance data indicative of cache memory contention of the compute node; means for determining a contention score as a function of the performance data, the contention score including a contention metric and a contention score level indicative of the contention metric; and means for storing the contention score in a cloud state database, the cloud state database accessible by a cloud controller of the cloud computing cluster.

Example 65 includes the subject matter of Example 64, and wherein the means for collecting the performance data comprises means for reading a performance monitoring unit of a processor core of the compute node.

Example 66 includes the subject matter of any of Examples 64 and 65, and wherein the means for collecting the performance data comprises means for reading a performance monitoring unit of an uncore of a processor of the compute node.

Example 67 includes the subject matter of any of Examples 64-66, and wherein the means for collecting the performance data comprises means for associating the performance data with one or more virtual machines executed by the compute node.

Example 68 includes the subject matter of any of Examples 64-67, and further comprising means for filtering the performance data to remove noise, prior to determining the contention score.

Example 69 includes the subject matter of any of Examples 64-68, and wherein the means for determining the contention score comprises means for determining the contention metric as a function of a number of cache misses of the compute node.

Example 70 includes the subject matter of any of Examples 64-69, and wherein the means for determining the contention metric comprises means for determining a rate of cache misses per reference number of instructions.

Example 71 includes the subject matter of any of Examples 64-70, and wherein the means for determining the contention metric further comprises means for aggregating the rate of cache misses per reference number of instructions for all processor cores of the compute node.

Example 72 includes the subject matter of any of Examples 64-71, and wherein the means for determining the contention score comprises means for determining the contention score level by quantizing the contention metric.

Example 73 includes the subject matter of any of Examples 64-72, and wherein the means for determining the contention score comprises means for determining the contention score level by comparing the rate of cache misses per reference number of instructions to one or more threshold values.

Example 74 includes the subject matter of any of Examples 64-73, and wherein the means for determining the contention score level further comprises means for comparing the rate of cache misses per reference number of instructions to a low contention threshold value; means for setting the contention score level to a low contention level in response to determining that the rate is less than the low contention threshold value; means for comparing the rate of cache misses per reference number of instructions to a high contention threshold value; means for setting the contention score level to a medium contention level in response to determining that the rate is greater than or equal to the low contention threshold value and less than the high contention threshold value; and means for setting the contention score level to a high contention level in response to determining that the rate is greater than or equal to the high contention threshold value.

Example 75 includes the subject matter of any of Examples 64-74, and wherein the low contention threshold value comprises 3 cache misses per thousand instructions, and wherein the high contention threshold value comprises 50 cache misses per thousand instructions.

What is claimed is:

1. A cloud controller of a cloud computing cluster, the cloud controller comprising:
a processor;
a compute service module to receive a request for a new virtual machine;
a communication module to receive a plurality of contention scores for a plurality of compute nodes of the cloud computing cluster, wherein each contention score of the plurality of contention scores indicates cache memory contention of a corresponding compute node of the plurality of compute nodes; and
a scheduler module to select a compute node from the plurality of compute nodes based on the corresponding contention score;
wherein the compute service module is further to schedule the new virtual machine on the selected compute node; and
wherein the contention score comprises a contention score level indicative of a contention metric of the compute node, wherein the contention score level comprises a categorization of a magnitude of the contention metric, the contention score level being determined by a comparison of a rate of cache misses of the compute node per reference number of instructions of the compute node to one or more threshold values, and wherein the contention score level comprises: (i) a low contention level indicative of the rate of cache misses per reference number of instructions being less than a low contention threshold value, (ii) a medium contention level indicative of the rate of cache misses per reference number of instructions being greater than or equal to the low contention threshold value and less than a high contention threshold value, or (iii) a high contention level indicative of the rate of cache misses per reference number of instructions being greater than or equal to the high contention threshold value.

2. The cloud controller of claim 1, wherein the contention score comprises a contention metric, the contention metric being a function of a number of cache misses of the compute node.

3. The cloud controller of claim 2, wherein the contention metric comprises a rate of cache misses per reference number of instructions of the compute node.

4. The cloud controller of claim 2, wherein to select the compute node comprises to sort the plurality of compute nodes based on the contention metric to select a compute node having the lowest contention metric.

5. The cloud controller of claim 1, wherein the low contention threshold value comprises 3 cache misses per thousand instructions, and wherein the high contention threshold value comprises 50 cache misses per thousand instructions.

6. One or more non-transitory, computer-readable storage media comprising a plurality of instructions that in response to being executed cause a cloud controller of a cloud computing cluster to:
receive a request for a new virtual machine;
receive a plurality of contention scores for a plurality of compute nodes of the cloud computing cluster, wherein each contention score of the plurality of contention scores indicates cache memory contention of a corresponding compute node of the plurality of compute nodes;

select a compute node from the plurality of compute nodes based on the corresponding contention score; and schedule the new virtual machine on the selected compute node;

wherein the contention score comprises a contention score level indicative of a contention metric of the compute node, wherein the contention score level comprises a categorization of a magnitude of the contention metric, the contention score level being determined by comparing a rate of cache misses of the compute node per reference number of instructions of the compute node to one or more threshold values, and wherein the contention score level comprises: (i) a low contention level indicative of the rate of cache misses per reference number of instructions being less than a low contention threshold value, (ii) a medium contention level indicative of the rate of cache misses per reference number of instructions being greater than or equal to the low contention threshold value and less than a high contention threshold value, or (iii) a high contention level indicative of the rate of cache misses per reference number of instructions being greater than or equal to the high contention threshold value.

7. The one or more non-transitory, computer-readable storage media of claim 6, wherein to receive the contention score comprises to receive a contention metric, the contention metric being a function of a number of cache misses of the compute node.

8. The one or more non-transitory, computer-readable storage media of claim 7, wherein to receive the contention metric comprises to receive a rate of cache misses per reference number of instructions of the compute node.

* * * * *